United States Patent [19]

Nigris et al.

[11] Patent Number: 5,274,664
[45] Date of Patent: Dec. 28, 1993

[54] METHOD AND DEVICE TO CONTROL THE FORCE APPLIED TO THE ELECTRODE-BEARING ARMS OF AN ELECTRIC ARC FURNACE

[75] Inventors: Giovanni Nigris, Mereto di Tomba; Gianni Gensini, Buia, both of Italy

[73] Assignee: Danieli & C. Officine Meccaniche SpA, Buttrio, Italy

[21] Appl. No.: 734,785

[22] Filed: Jul. 23, 1991

[30] Foreign Application Priority Data

Jul. 23, 1990 [IT] Italy ................. 83446 A/90

[51] Int. Cl.$^5$ ............................... H05B 7/12
[52] U.S. Cl. ..................... 373/106; 373/105; 373/94
[58] Field of Search ............ 373/94, 106, 105, 70, 373/98, 100, 101, 69, 38, 50, 52, 53

[56] References Cited

U.S. PATENT DOCUMENTS

| | | | |
|---|---|---|---|
| 3,614,284 | 10/1971 | Scheidig et al. | 373/105 |
| 3,650,311 | 3/1972 | Fritsche | 373/105 |
| 3,937,869 | 2/1976 | Markarian et al. | 373/106 |
| 4,131,754 | 12/1978 | Roberts | 373/106 |
| 4,349,911 | 9/1982 | Orbans | 373/105 |
| 4,586,187 | 4/1986 | Hein et al. | 373/106 |
| 4,742,528 | 5/1988 | Stenzel | 373/105 |

FOREIGN PATENT DOCUMENTS

| | | |
|---|---|---|
| 42689 | 12/1981 | European Pat. Off. |
| 2312603 | 3/1974 | Fed. Rep. of Germany. |
| 2930563 | 2/1981 | Fed. Rep. of Germany. |
| 2402993 | 9/1977 | France. |
| 301879 | 4/1971 | U.S.S.R. ............ 373/106 |
| 418991 | 3/1974 | U.S.S.R. ............ 373/106 |
| 936471 | 6/1982 | U.S.S.R. ............ 373/106 |
| 1229980 | 5/1986 | U.S.S.R. ............ 373/106 |

*Primary Examiner*—Bruce A. Reynolds
*Assistant Examiner*—John A. Jeffery
*Attorney, Agent, or Firm*—Antonelli, Terry, Stout & Kraus

[57] ABSTRACT

Method and device to control the force applied to the electrode-bearing arms of an electric arc furnace, the vertical regulation of the electrodes being achieved with an electrohydraulic or electropneumatic system consisting of an operational cylinder actuated by a fluid under pressure so as to raise and lower the electrodes, the control means of the system being adjustable by means of an electrical device, whereby the working pressure of the operational cylinder is measured by a pressure transducer (15) and is processed by a processor system (16) so as to obtain the weight of the electrodes and the condition of static pressure, the processor system (16) governing a quick-response servovalve (18) and being governed by an interface (19) of the system that adjusts the electrical current fed to the electrodes (11).

7 Claims, 1 Drawing Sheet

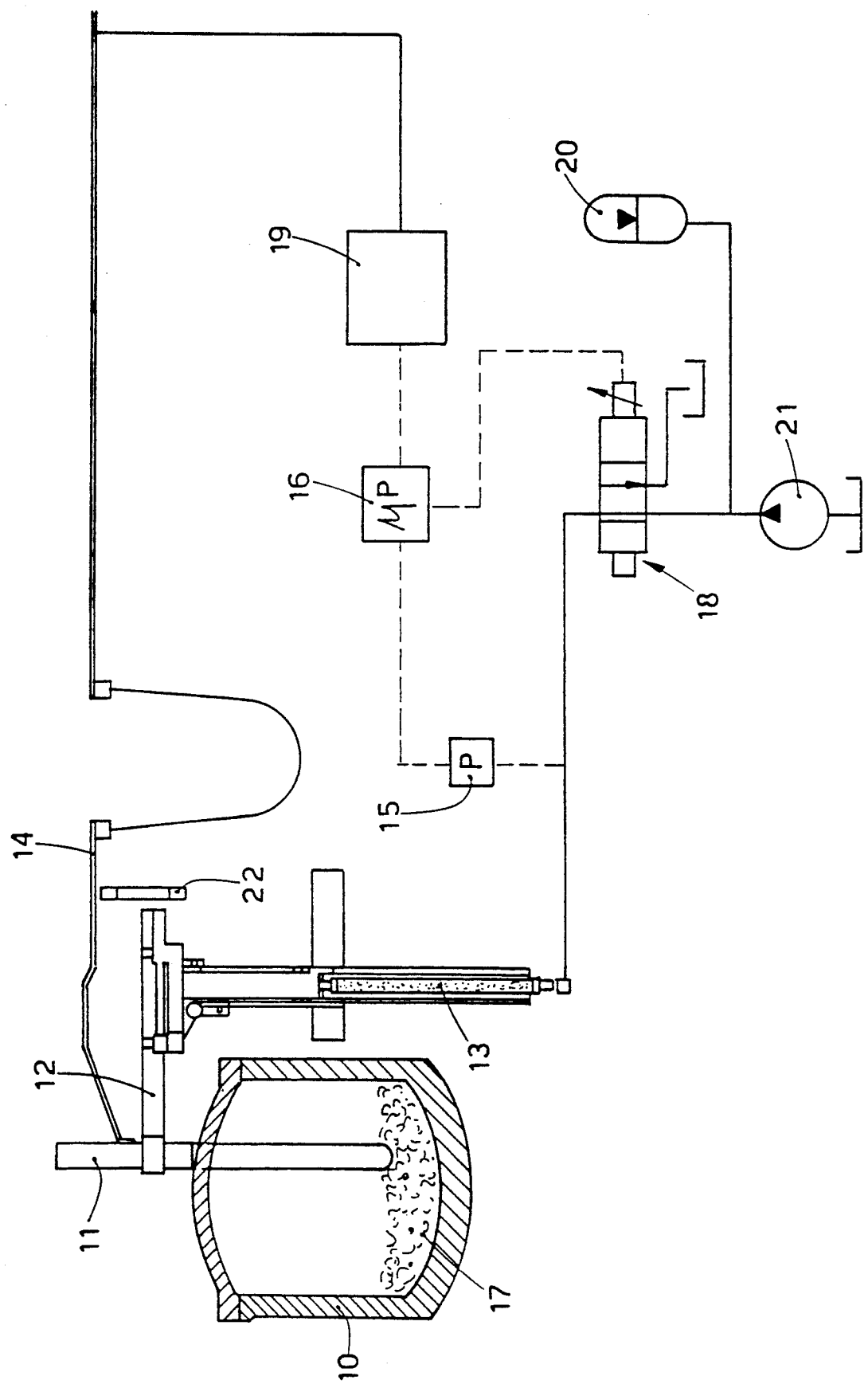

5,274,664

METHOD AND DEVICE TO CONTROL THE FORCE APPLIED TO THE ELECTRODE-BEARING ARMS OF AN ELECTRIC ARC FURNACE

BACKGROUND OF THE INVENTION

This invention a and relative device to control the force applied to the electrode-bearing arms of an electric arc furnace.

To be more exact, the invention concerns a method and device suitable to control constantly the force applied to the electrode-bearing arms of an electric arc furnace, the force being suitable to lift and position the electrode in a required manner in a vertical direction.

By means of the invention it is possible also to monitor the mass of the electrode at any time during smelting so as to know the relative wear of the electrode and to be able to act accordingly.

Document DE 2.312.603 is known and concerns a device to prevent breakage of electrodes in electric furnaces having electrical, electrohydraulic or electropneumatic regulation, in particular for smelting of scrap; this device consists of an operational cylinder actuated by a fluid under pressure so as to lift and lower the electrodes, the control means of the cylinder being adjustable by means of an electrical commutator device which responds in the event of excursions of the current of the electrodes from the nominal value.

In the above document a pressure switch is connected to the circuit under pressure of the operational cylinder and transmits by means of its switch to the control means a signal to lift the electrodes in the event of a drop of pressure in the operational cylinder when the electrodes contact non-conductive materials and when a given response pressure is reached in the operational cylinder.

The circuit is also connected to a switch which, upon reduction of pressure in the operational cylinder, interrupts simultaneously the current fed to the electrical regulation circuit and, upon attainment of the response pressure, restarts the current, which in turn transmits a signal for lowering of the electrodes.

However, the contents of the above document involve a plurality of unsuitable indications. The circuit cannot monitor constantly and continuously by means of the pressure switch the variable value of the static pressure in the cylinder and therefore can perform neither an automatic control of the value of wear of the electrodes nor the memorisation of the value of the weight of the arm at every speedy descent of the electrodes for the beginning of smelting, nor regulation in a closed circuit with a servovalve having a speedy response for control of the electrodes by means of a pressure control; the circuit is not even able to carry out automatic regulation with an electronic system to regulate the electrodes so as to prevent any short circuits at the electic arc during smelting, nor can it prevent automatically an accidental breakage of the electrodes.

The above known document discloses operation by means of a timer and a relay and therefore provides for regulation in steps, which in itself is unstable, slow and discontinuous.

Moreover, the known document employs a pressure switch, which of necessity has to be set with a given minus step as compared to the minimum actual value; and therefore when the pressure switch senses the pressure of actuation, there is the danger that the electrode may be already broken since this step of interval may be too great for the typical requirements of the electrode.

Furthermore, the above known document does not disclose acting by perforating mechanically any insulating material found between the electrode and the metallic mass to be melted.

SUMMARY OF THE INVENTION

The present applicant has tackled the problem of obviating the above shortcomings and has designed, tested and embodied a device according to the invention.

The method and device according to the invention enable the value of wear of the electrode to be controlled automatically, that is to say, they make an automatic control possible on the basis of the variation in the weight of the electrode.

According to the invention it thus becomes possible to process the variation in the weight of the electrode during the various steps of the smelting.

Moreover, the invention makes possible the monitoring and storage of the value of the weight of the arm and of the electrode applied to that arm at each swift descent of the electrodes when the smelting begins.

Furthermore, the invention enables regulation to take place in a closed circuit for control of the electrodes by means of a constant and continuous control of the pressure.

Besides, the invention permits graduation of the weight of the electrodes on any insulating material present beween the electrode and the metallic mass to be melted so as to perforate the material mechanically and thus to make possible the striking of the electric arc.

The invention permits also an automatic regulation with an electronic electrode-regulation system to prevent any short-circuits at the electric arc during smelting.

According to the invention the control of the position of the electrodes takes place by means of a limit switch or by linear position transducers, whether the latter be continuous or be positioned at the critical points involved.

According to the invention, by monitoring continuously the variation in pressure in the circuit and by controlling that pressure with the pressure corresponding to the weight of the arm at the time of each speedy descent, it is possible to maintain a position of balance of the weight of the electrode with variations of its weight and to lift the electrode swiftly in the event of a quick and undesired variation of the weight burdening the arm.

The invention positions directly on the operational cylinders a continuous pressure transducer, which detects the pressure and converts it into analogue or digital values that are received by a processor system according to the regulation requirements.

The pressure transducer is fitted directly on the cylinder to keep the value of dynamic pressure as close as possible to the value of static pressure.

The transducer fitted to the cylinders is also equipped internally with a temperature compensator so as to keep always accurate the signal of monitoring of the hydraulic pressure.

The processor system is connected to a servovalve, known in the state of the art and having a speedy response, which controls the operational cylinder and receives information from and supplies it to the system of regulation of the electrodes.

A possible pressure storage vessel and a system of a known type to deliver fluid under pressure are included.

According to the invention the pressure transducer fitted directly to the cylinder remains always active in the circuit and monitors swiftly and accurately the dynamic pressure and can therefore detect and manage continuously the pressure existing in the circuit.

By means of the invention, when the electrode is in its raised position before its swift descent, the pressure is measured and memorised, and therefore the weight of the electrode is evaluated and taken as a reference point so as to have a precise reference element at each swift descent.

When the electrode descends by some centimeters of its travel from its raised position, the pressure transducer fitted to the cylinder reads the dynamic pressure and memorises the static pressure plus the differential of dynamic pressure.

The transducer supplies this information to the processor system, which sets a control point value for corrective intervention differing by less than a preset percentage (about 1%) from the dynamic value memorised.

If the electrode is rested on the scrap, a reduction takes place in the dynamic pressure since the system is displaced speedily towards the static pressure and thereafter also towards a further very quick reduction in the static pressure.

In this case the pressure control restores the system at once by means of the electrohydraulic servovalve having a swift response, and the system causes the electrode to be raised at once and keeps it at the set point value indicated by the regulation system.

However, this raising of the electrode takes place only if an arc condition exists, so that the force of the weight, together with a possible overpressure, can act on any insulating material and can perforate it.

In this way detrimental short-circuits at the electric arc and accidental breakages of the electrodes are avoided.

The response times of the system are of the order of 50-80 milliseconds; the system normally responds in a maximum time of 100 milliseconds.

Owing to the very quick response time and to the interval of corrective intervention of about 1% of the value memorised, the proposed system obviates accidental breakages of the electrode and accidental short-circuits.

BRIEF DESCRIPTION OF THE DRAWING

Let us now see a preferred embodiment of the invention with the help of the attached figure, which is given as a non-restrictive example. The figure shows a diagram of an electric furnace with a relative electrode and an actuation and control circuit according to the invention.

DESCRIPTION OF THE PREFERRED EMBODIMENTS

In the figure an electric arc furnace 10 with scrap 17 to be smelted within it cooperates with electrodes 11 borne by an arm 12 actuated vertically by an operational cylinder 13.

Each electrode 11 is fed by its own high-voltage line 14 fed and controlled by its own regulation system.

The operational cylinder 13 is fed by a system 21 which delivers fluid under pressure and which may cooperate with a pressure storage vessel 20.

The operational cylinder 13 is fed through a quick-response control servovalve 18, and a continuous pressure transducer 15 is comprised in the immediate vicinity of the operational cylinder 13 and may be of a thermally compensated type.

This continuous pressure transducer 15, which is substantially installed on the cylinder 13, provides continuous real information for a processor system 16, which on the one hand governs the servovalve 18 and on the other hand receives information from and supplies it to an interface 19 of the system which regulates the electrical current fed to the electrodes 11.

According to a variant the processor system 16 receives information from the pressure transducer 15 at preset and predeterminable intervals.

As we said earlier, systems with a linear transducer or a limit switch 22 may be comprised to control the terminal positions of the arm 12 that bears the electrodes 11.

When the arm 12 is in a raised position, the pressure transducer 15 memorises the static pressure and supplies information to the processor system 16, which calculates the weight of the system consisting of the electrode, the arm and the burdening part of the operational cylinder 13.

When the electrode 11 has begun its descent from its raised position along a preset segment, such as a length of some centimeters for instance, the pressure transducer 15 reads the dynamic pressure and supplies this information to the processor system 16, which stores the static pressure plus the dynamic pressure differential.

The processor system 16 applies an intervention value differing by less than 1% (but any percentage intervention threshold could be selected) from the dynamic pressure value received from the pressure transducer 15 acting on the cylinder 13.

When the electrode 11, continuing its descent, rests on the scrap 17, the dynamic pressure is converted swiftly into simple static pressure and, if no corrective intervention takes place, the static pressure too diminishes quickly.

The pressure transducer 15, monitoring continuously this variation in dynamic and static pressures, supplies this information to the processor system 16, which takes corrective action on the quick-response servovalve 18, which causes the electrode 11 to be lifted and keeps it at a static pressure value read by the pressure transducer 15 and required by the processor system 16.

In this way, in view of the swiftness of corrective intervention, short-circuits at the electric arc are obviated and accidental breakages of electrodes are avoided.

If, however, the interface 19 gives warning that the arc has still not struck between the electrode and the metallic mass, thus indicating the existence of an insulating layer, the processor system 16 does not intervene but lets the force of the weight of the electrode act upon and perforate the insulating layer.

If the processor system 16 detects a too long time of static pressure, such time indicating possible problems in perforating the insulating layer, the processor system 16 can also apply a pressure to act on the electrode to assist the latter to perforate the insulating layer.

We claim:

1. Method to control the force applied to the electrode-bearing arms of an electric arc furnace, the vertical regulation of the electrodes being achieved with an electrohydraulic or electropneumatic system consisting of an operational cylinder actuated by fluid under pressure so as to raise and lower the electrodes, the control means of the system being adjustable by means of an electrical device, said method comprising measuring the working pressure of the operational cylinder by a pressure transducer and processing the measurements obtained by said pressure transducer by a processor system so as to obtain the weight of the electrodes and the condition of the static pressure, reading and storing dynamic pressure, responsive to the electrode passing from its raised position to its working position along a first initial segment of its travel, by the processor system whereby the processor system sets a control point value for corrective intervention differing by less than a preset percentage from the stored dynamic pressure, and governing a quick response servovalve by the processor system if said control point value is reached, said processor system being governed by an interface of the system that adjusts the electrical current fed to the electrodes.

2. Method as claimed in claim 1 whereby the processor system 11 causes the electrode (11) to be lifted unless the interface gives a contrary warning.

3. Method as claimed in claim 1, whereby the processor system applies an overpressure to the electrode if the time of static pressure exceeds a given value.

4. Method as claimed in claim 1, whereby responsive to the electrode on the scrap, the pressure transducer warns the processor system which governs the servovalve and causes the electrode to be lifted and kept at the preset value of pressure if the interface advises that the arc has struck.

5. Device to control the force applied to the electrode-bearing arms of an electric arc furnace, vertical adjustment of the electrodes being achieved with an electrohydraulic or electropneumatic system consisting of an operational cylinder actuated by fluid under pressure so as to raise and lower the electrodes, the control means of the system being adjustable by means of an electrical device, whereby a quick-response servovalve is positioned on the line of feed of fluid under pressure to the operational cylinder, while a pressure transducer is installed on the operational cylinder and is connected to a processor system, which receives information from and supplies information to an interface of the regulation system and governs the quick-response servovalve, the device being characterized in that when the electrode is in its raised position, the processor system reads the weight of the electrode plus the weight of the arm plus the burdening weight of the operational cylinder and in that, responsive to the electrode passing from its raised position to its working position along a first initial segment of its travel, the processor system reads and stores dynamic pressure, and wherein the pressure transducer is installed near the operational cylinder.

6. Device as claimed in claim 5, in which the pressure transducer is compensated thermally.

7. A device for controlling force applied to an electrode bearing arm of an electric arc furnace, comprising:

An electrohydraulic or electropneumatic system including an operational cylinder actuated by fluid under pressure for raising and lowering the electrode;

a quick response servovalve positioned on a line of and controlling feed of fluid under pressure to the operational cylinder;

a pressure transducer installed on or near the operational cylinder for measuring static pressure when the electrode is in its raised position and for measuring dynamic pressure responsive to the electrode passing along a first initial segment of travel from its raised position to its working position;

a processor system connected to said pressure transducer for receiving and storing the static and dynamic pressure information therefrom, and connected to and governing said quick response servovalve; and an interface for regulating electrical current fed to the electrode, said processor system being connected to said interface for receiving information therefrom and supplying information thereto;

wherein said processor system calculates the weight of the electrodes, the weight of the electrode bearing arm and the burdening weight of the operational cylinder based on the value of static pressure received from said pressure transducer and sets a control point value for corrective intervention based on the dynamic pressure value received from said pressure transducer.

* * * * *